Figure 1:
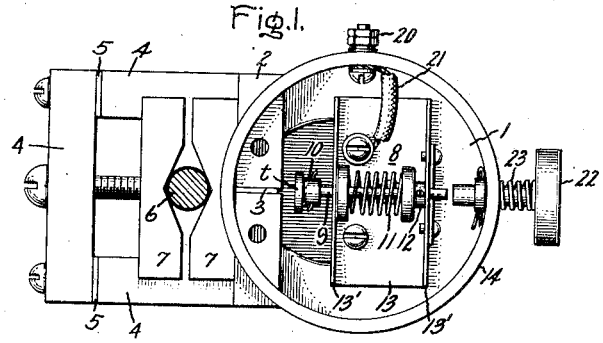

Dec. 27, 1938.  B. D. BEDFORD  2,142,015
REVERSE CURRENT RELAY
Filed Feb. 24, 1936

Inventor:
Burnice D. Bedford,
by Harry E. Dunham
His Attorney.

Patented Dec. 27, 1938

2,142,015

UNITED STATES PATENT OFFICE 2,142,015

REVERSE CURRENT RELAY

Burnice D. Bedford, Schenectady, N. Y., assignor to General Electric Company, a corporation of New York Application February 24, 1936, Serial No. 65,293

7 Claims. (Cl. 200—93)

My invention relates to control and indicating systems and more particularly to high speed devices which are capable of controlling an electric circuit in response to electrical transients of short duration.

There has been encountered a need for mechanical electro-responsive equipment of simple and inexpensive construction which will operate in a positive and reliable manner in response to electrical transients to effect a circuit operation. This need is particularly great in connection with current reversal devices. Many of the prior art devices fail to operate satisfactorily in response to reverse current transients of short duration. Heretofore, in electro-responsive devices for this type of application where the current reverses and obtains a relatively large value within a very short interval of time, a reverse magnetism is established in the devices in a shorter period of time than that required for the actuation of the device, resulting in a failure of the device to perform the desired operation.

It is an object of my invention to provide an improved electro-responsive device which obviates the above difficulties and which will operate in response to electrical transients of short duration.

It is another object of my invention to provide a high speed electro-responsive device which will operate in a simple and reliable manner in response to current reversals of short duration.

It is a further object of my invention to provide a high speed control and indicating system for electric circuits.

In accordance with the illustrated embodiment of my invention, a high speed electro-responsive device is provided which will operate in a positive and reliable manner in response to electrical transients of short duration. More specifically, an electro-mechanical structure is provided which is susceptible of responding to transients in which the electrical quantity to be controlled experiences a reversal in direction. The specific structure employed involves the use of two parallel magnetic circuits bridged by a shunt magnetic circuit of peculiar design, whereby precise and dependable operation is obtained in response to small variations in the magnetic flux established in the shunt portion. In the particular embodiment described hereinafter, one of the parallel magnetic circuits comprises a unidirectional magnetizing element, such as a permanent magnet of exceptional strength to establish in that parallel path and in the shunt magnetic path a component of unidirectional flux. The second parallel magnetic path comprises a structure of predetermined reluctance upon which the electrical quantity to be controlled acts. A coil or conductor is associated with this second parallel magnetic path to establish in this path a flux which flows through the shunt path and is in the same direction therein as the component of flux established by the permanent magnet when the electrical quantity to be controlled is in a predetermined normal direction. Upon reversal in direction of the electrical quantity to be controlled, the coil or conductor tends to establish a component of flux in the shunt magnetic path in opposition to the component of flux established by the permanent magnet. Under this latter condition, however, due to the proportions of the second parallel magnetic path and the shunt magnetic path, the component of flux established by the permanent magnet in the shunt magnetic path does not change in direction but experiences a small reduction in magnitude. The shunt magnetic path is provided with a high reluctance portion which is arranged to provide a predetermined configuration of fringing flux in the neighborhood of the high reluctance portion. An armature of peculiar design is associated with the shunt magnetic path and is arranged to be released upon slight variation in the value of the fringing flux. This combination of features makes it possible to obtain high speed actuation of the armature member in response to the variations in the electrical quantity to be controlled.

For a better understanding of my invention together with other and further objects thereof, reference may be had to the following description taken in connection with the accompanying drawing and its scope will be pointed out in the appended claims.

Figure 2:
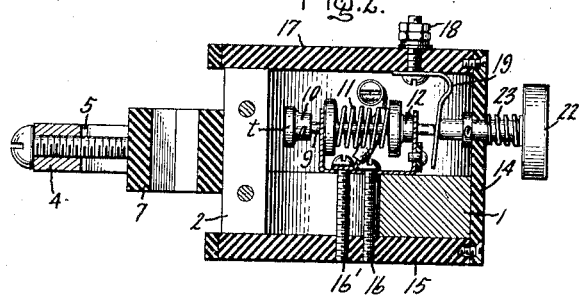
Figure 3:
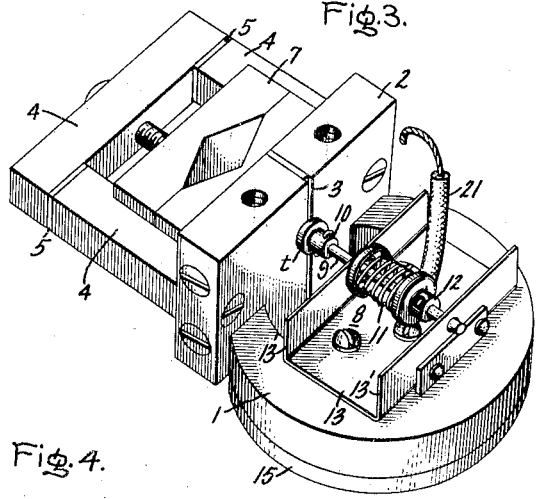
Figure 4:
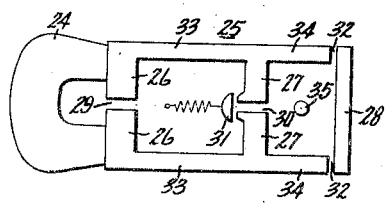

Referring to the drawing, Fig. 1 is a plan view of an electro-responsive device embodying the principles of my invention; Fig. 2 is a partial cross sectional elevational view of the arrangement shown in Fig. 1, while Fig. 3 is a view in perspective of the electro-responsive device shown in Fig. 1 and Fig. 2 with the casing removed. Fig. 4 is a diagrammatic representation of a modified electro-responsive device embodying additional features to assure a predetermined operation.

Referring now to Fig. 1 of the drawing, there is shown a plan view of an electro-responsive device embodying the principles of my invention and which is susceptible of high speed operation. The electro-responsive device comprises a magnetic path including a suitable unidirectional magnetizing element, such as a permanent magnet 1. A shunt magnetic path 2 is provided to bridge the magnetizing element 1. This magnetic path 2 is constructed with a relatively large cross-sectional area and the permanent magnet 1 establishes a large component of flux therein. A portion 3 of this shunt path 2 is constructed of nonmagnetic material, or the path 2 may be provided with an air gap to afford a high reluctance section. A second magnetic path 4 is arranged to bridge the shunt path 2 and the permanent magnet 1. Non-magnetic shims 5 may be used to adjust the reluctance of path 4 to obtain considerable variation in the reluctance of magnetic path 4. The reluctance of path 2 is considerably less than the reluctance of path 4 by virtue of the shorter length and greater cross-sectional area of path 2. A magnetizing element, such as a single conductor 6, is associated with the path 4 to establish a magnetic flux in path 4. Clamps or retaining members 7 may be provided to retain the conductor 6 in fixed relationship with the electro-responsive device. The armature head member 10 is provided with an element of thickness $t$ to cooperate with the fringing flux appearing in the vicinity of the high reluctance portion 3 of shunt path 2.

The armature 9 is provided with a biasing means, such as a spring 11, which tends to move the armature away from the gap 3 when the flux decreases. The armature 9 is also provided with a collar 12 which controls the limit of movement of the armature 9. The armature assembly 8 may be supported by a frame 13 having vertical supporting flange portions 13'. The permanent magnet 1 and the armature assembly 8 may be housed within an adjustable receptacle, such as a cylindrical housing or casing 14 having a base 15. The permanent magnet 1 may be secured to the base 15 by means of screws 16 and 16'. A removable top or lid 17 may be provided, and the lid 17 may be provided with an adjustable connector 18 which may be connected to an associated circuit to be controlled. A finger contact 19 is connected to the connector 18. A second connector 20 may also be provided on the cylindrical housing 14, and the connector 20 may be connected to the frame 13 by means of a conductor 21. The finger contact 19 is arranged to have an extremity extending between the armature 9 and a reset member 22 which is biased by a suitable means such as a spring 23. When the armature 9 is in the released position, the armature engages the finger contact 19, establishing thereby an electrical connection between connector 18 and connector 20.

The operation of my invention may be best explained by considering an embodiment diagrammatically illustrated in Figs. 1, 2, and 3. The permanent magnet 1 being of exceptional strength establishes in the shunt path 2 a large unidirectional component of flux of substantially constant value. Since the reluctance of the shunt path 2 is relatively small compared with the reluctance of the parallel magnetic path 4, the amount of flux in the magnetic shunt path 2 will be considerably larger than the flux in the parallel magnetic path 4. Due to the high reluctance portion 3 of the shunt magnetic path 2 and due to the fact that the flux density in the magnetic path 2 is comparatively high, there will be an appreciable fringing flux in the vicinity of the high reluctance portion 3. The strength of the permanent magnet 1 and the reluctance of the shunt magnetic path 2 are chosen so that under all conditions of operation there is an appreciable fringing flux. Of course, the amount of fringing flux and the density thereof will vary under various operating conditions. Under reverse magnetization, that is, when the magneto-motive force acting on the magnetic path 4 attains a relatively large value in the reverse direction, the magnetic path 4 becomes saturated to afford a limitation of the reverse magnetization which this path may impress upon the magnetic path 2 and the permanent magnet 1.

If it be assumed that the conductor 6 associated with the parallel magnetic path 4 is conducting current in the normal direction, the magnetomotive force and hence the flux established by the conductor 6 in the parallel path 4 are chosen so that these quantities are in opposition to the magnetomotive force and the flux which the permanent magnet would tend to establish in the magnetic path 4. However, the magnetomotive force and the flux in the shunt path 2, due to the effect of the conductor 6, will be in the same direction as the flux established by the permanent magnet 1. This condition, of course, will increase the flux in the shunt path 2 and will increase the amount of fringing flux appearing in the vicinity of the high reluctance portion 3.

The armature assembly 8 comprising the armature head member 10 is arranged so that the head member 10 may be maintained in juxtaposition with the shunt magnetic path 2 against the action of the spring 11 to effect a bridging of the high reluctance portion 3. The force due to the spring 11 is adjusted so that movement of the armature 9 away from the shunt magnetic path 2 is effected by a slight decrease in the amount of flux appearing in the vicinity of the high reluctance portion 3. It has been found that if the head portion 10 is provided with a co-operating section $t$ having an effective thickness substantially equal to the length of the high reluctance portion 3, precise and reliable operation is obtained in response to slight variations in the amount of fringing flux.

If it be assumed that the current conducted by the conductor 6 reverses, the effect of this reverse magnetization will be to establish a magnetomotive force acting on the shunt magnetic circuit 2 in opposition to the magnetomotive force established by the permanent magnet 1. The net result will be a decrease in the magnetomotive force in the shunt path 2 and a decrease in the amount of fringing flux appearing in the vicinity of the high reluctance portion 3. Since the armature assembly 8 is arranged to operate on small differentials of fringing flux, or in response to a predetermined minimum flux, the armature 9 will be moved to the position shown in Figs. 1 and 2 by the spring 11 to complete the electric circuit between terminals 18 and 20, which operation may be employed to effect any desired control or indicating operation. When the current reverses, the circuit is closed effecting movement of the armature 9 to engage finger contact 19 which is connected to the terminal 18. This action completes a circuit from terminal 18 to terminal 20. The reset member 22 is employed to move the armature 9 and the head member 10 to the position shown in Fig. 3 where the member 10 is in juxtaposition with the shunt magnetic path 2.

The electro-responsive element shown in Figs.

1, 2, and 3 will operate satisfactorily in those applications where an electrical quantity reverses direction and obtains a relatively large value in the reverse direction. Since the net magnetic flux in the shunt magnetic path 2 maintains the same direction irrespective of the direction and magnitude of the magnetomotive force impressed upon the parallel magnetic path 4, the reverse magnetism associated with the parallel magnetic circuit 4 will not prevent the desired operation of the armature 9.

Referring to Fig. 4 of the drawing, there is shown a modification of the electro-responsive device illustrated in Figs. 1, 2, and 3. A permanent magnet 24 is employed to establish unidirectional flux in the core structure 25 having shunt magnetic paths 26, 27, and 28. The shunt path 26 is provided with an air gap 29 and the shunt magnetic path 27 is provided with an air gap 30 which armature 31 is arranged to bridge. Air gaps 32 are arranged in series with the shunt magnetic path 28. The core structure 25 is provided with yoke members 33 of restricted cross-sectional area and with members 34 also of restricted cross-sectional area. Preferably the cross-sectional area of the yoke members 33 and 34 should be substantially equal. A magnetizing element, such as a conductor 35, is associated with the magnetic circuit comprising shunt paths 27 and 28 and members 34 and is arranged to establish in this circuit a magnetic flux the direction of which is dependent upon the direction of the electrical quantity to be controlled.

The operation of the modified embodiment of my invention diagrammatically illustrated in Fig. 4 is substantially the same as the operation of the electro-responsive device described in conjunction with Figs. 1, 2, and 3. The device shown in Fig. 4 provides an additional feature comprising the highly saturated restricted members 33 which are employed to prevent the conductor 35 from exerting an opposing magnetomotive force on the permanent magnet 24 and which prevents the establishment of a reverse magnetization in the shunt path 27. When the current in the conductor 35 is in a normal direction, the magnetomotive force due to this conductor is in a direction to increase the magnetic flux passing through the shunt path 27 and hence does not interfere with the intended operation of armature 31. Upon reversal of the current in the conductor 35, the magnetomotive force due to conductor 35 reduces the magnetic flux in the path 27 to effect a release of the armature 31. Since the restricted members 33 are highly saturated, the reverse magnetism established by the conductor 35 does not tend to demagnetize the permanent magnet 24 but merely effects a redistribution of the flux in the core member 25 from shunt path 27 through shunt path 28 comprising members 34 and air gaps 32. Furthermore, since the cross sectional areas of the yoke members 33 and 34 are substantially equal, the circuit comprising the magnet 24 and the members 33 operate as a source of substantially constant flux which also tends to prevent the reverse magnetization from demagnetizing the magnet 24.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electromagnetic device comprising a unidirectional magnetizing element, a shunt magnetic path bridging said unidirectional magnetizing element and having a relatively high reluctance portion, a second magnetic path of relatively high reluctance, a magnetizing element associated with said second magnetic path, for establishing a unidirectional flux in said second magnetic path in accordance with a predetermined electrical quantity and for effecting substantial saturation of said second magnetic path when said electrical quantity reverses direction from a predetermined normal direction so as to prevent demagnetization of said unidirectional magnetizing element, said unidirectional magnetizing element being arranged to establish in said shunt path a component of unidirectional flux and to provide a fringing flux in the vicinity of said high reluctance portion, and an armature member arranged to be maintained in juxtaposition with said shunt path by said fringing flux when said electrical quantity maintains said predetermined normal direction.

2. An electromagnetic device comprising a permanent magnet, a shunt magnetic path bridging the poles of said permanent magnet and having a relatively high reluctance portion, a second magnetic path of relatively high reluctance for bridging said shunt magnetic path including a yoke member of restricted cross-sectional area relative to that of said shunt magnetic path, a magnetizing element associated with said second magnetic path, said permanent magnet being arranged to establish in said shunt path a component of unidirectional magnetic flux and for providing a fringing flux in the vicinity of said high reluctance portion, and an armature member arranged to be maintained in juxtaposition with said shunt path by said fringing flux.

3. An electromagnetic device comprsing a unidirectional magnetizing element, a shunt magnetic path bridging said unidirectional magnetizing element, said shunt magnetic path having a high reluctance portion and said unidirectional element being arranged for establishing in said shunt path a component of unidirectional flux, a second magnetic path arranged in shunt relation to said magnetizing element and bridging said shunt path including a yoke member of restricted cross-sectional area relative to that of said shunt magnetic path, a second magnetizing element associated with said second magnetic path and an armature having a magnetic head member for bridging said high reluctance portion of said shunt path, said head member having an effective thickness substantially equal to the length of said high reluctance portion.

4. An electromagnetic device comprising a unidirectional magnetizing element, a shunt magnetic path bridging said unidirectional magnetizing element and having a high reluctance portion, a second magnetic path arranged in shunt relation with said unidirectional magnetizing element and bridging said shunt path, said unidirectional magnetizing element being arranged to establish a component of flux in said shunt path and for producing a fringing flux in the vicinity of said high reluctance portion, a second magnetizing element associated with said second magnetic path for establishing in said shunt path a component of flux in the same direction as said unidirectional component of flux to effect an increase in said fringing flux when the current through said second mentioned magnetizing element is in a predetermined direction and for producing substantial saturation of said second magnetic path so as to prevent demagnetization of said unidirectional magnetizing element and for effecting a decrease in said unidirectional component of flux and a substantial decrease in said fringing flux when the current through said second mentioned magnetizing element reverses, and an armature member arranged to be maintained in juxtaposition with said shunt magnetic path by said fringing flux when the current through said second mentioned magnetizing element is in a predetermined direction and being arranged to be released from said shunt magnetic path when said current reverses.

5. In combination, an electro-responsive device comprising a permanent magnet, a shunt magnetic path of relatively high reluctance for bridging the poles of said permanent magnet, a magnetic circuit comprising a magnetic path having a relatively high reluctance portion, yoke members of restricted area for bridging said magnetic circuit and said shunt magnetic path, said permanent magnet being arranged to saturate said yoke members and to produce a component of unidirectional flux in said magnetic path of said magnetic circuit, a magnetizing means associated with said magnetic circuit for varying the amount of flux in said magnetic circuit, and an armature arranged to be held in justaposition with said magnetic path of said magnetic circuit when the flux in said last mentioned magnetic path maintains a predetermined minimum value.

6. In combination, an electro-responsive device comprising a permanent magnet, a shunt magnetic path for bridging the poles of said permanent magnet and having a high reluctance portion, a second magnetic path bridging said first mentioned magnetic path, a magnetizing element associated with said second magnetic path, said permanent magnet being arranged to establish a unidirectional flux in said first mentioned shunt magnetic path and for establishing a fringing flux in the vicinity of said high reluctance portion, an armature being arranged to be maintained in one position by said fringing flux and being arranged to be released to a second position, means for moving said armature away from said shunt magnetic path to said second position, a casing having a cover for enclosing said permanent magnet, said high reluctance portion of said shunt magnetic path, said armature and said means, a finger contact mounted on said cover and arranged to be engaged by said armature in said second mentioned position, and a reset member carried by said casing for cooperating with said contact to move said armature from said second position to said first position.

7. An electromagnetic device comprising a permanent magnet, a core member having members provided with relatively restricted cross-sectional areas which said permanent magnet is arranged to saturate magnetically providing a substantially constant source of flux, a shunt magnet path having a high reluctance portion for bridging said restricted members and a magnetizing element responsive to the direction of an electrical quantity associated with said core member and arranged to oppose the flux in said restricted members when said electrical quantity maintains a predetermined direction and arranged to assist the flux in said restricted members when said electrical quantity reverses direction to vary the flux through said shunt path, an armature member arranged to bridge said high reluctance portion, and means for moving said armature away from said high reluctance portion when said quantity reverses direction.

BURNICE D. BEDFORD.